United States Patent Office 2,755,191
Patented July 17, 1956

2,755,191

MANUFACTURE OF BACTERICIDAL CLEAR ICE

Adolf Schmitz, Essen, Germany, assignor to Th. Goldschmidt A. G., Essen, Germany, a German company No Drawing. Application July 27, 1953,
Serial No. 370,641

Claims priority, application Germany July 31, 1952

3 Claims. (Cl. 99—224)

This invention relates to manufacture of bactericidal clear ice; and it consists in a process of manufacturing such an ice wherein an amphoteric surface active agent, having at least one basic nitrogen atom with an attached aliphatic substituent group containing at least 6 carbon atoms and also having at least one free carboxyl group attached to said basic nitrogen atom by means of a bi-valent low-molecular bridging group which may be aliphatic, aryl or aralkyl, is added to the water to be frozen in the proportions of from about 0.01 to 1 g. per 1 liter and the water is then frozen while air is being blown through the water. The invention also includes the bactericidal clear ice which is produced by the described process; all as more fully hereinafter set forth and claimed.

In the manufacture of clear ice used in the food industry for the preservation of fish and other food items, such as ice cream, cold drinks, oysters, lobsters etc. wherein the ice usually does not come into direct contact with the food to be consumed, the usual practice is to blow air through the water while it is freezing. It has been found that various types of bacteria tend to develop in the containers used for the transportation and storage of such food items and the discovery of a satisfactory method of inhibiting this bacterial growth has long been a desideratum in the art.

In testing various bactericidal agents for this purpose it has been found that most of the surface active agents, which produce antibacterial activity when added to the water to be frozen, cause various detrimental results. Some produce cloudy ice and most cause frothing to take place as the air is blown through the water during free freezing step. The quaternary ammonium compound dodecyl dimethyl benzyl ammonium chloride, for example, when added to water followed by freezing of the water while air is blown therethrough produces so much foam that a satisfactory ice cannot be produced. Frothing, of course, causes air to be trapped in the ice resulting in an inferior product.

In an extensive series of tests I have discovered a well defined class of surface active agents which, when added to the water to be frozen, produce none or at most a negligible amount of frothing as the air is blown through during the freezing step. This particular class of agents fortunately possesses sufficient bactericidal activity to completely inhibit the growth of undesired bacteria while at the same time these agents are unobjectionable from the public health standpoint; that is, in the minute concentrations in which they are used they would produce no physiological effects even though the ice should be consumed. Precautions are, of course, taken to prevent this type of ice from being consumed; hence the use of my bactericidal ice is unobjectionable for the purposes mentioned.

The particular surface active agents demonstrated to be satisfactory in my tests are those which have at least one basic nitrogen atom with at least one aliphatic chain of at least 6 carbon atoms attached thereto and at least one free carboxyl group attached to one of the basic nitrogen atoms by means of a bi-valent low-molecular bridging group. These agents are dissolved in the water before the freezing step. My tests show that all amphoteric surface active agents possessing this basic structure are operative in my process and possess the advantages enumerated above. These particular surface active agents combine no-frothing properties with high bactericidal properties.

I have discovered that the aliphatic chain substituent, which will be designated as $R_1$ in the following, must contain at least 6 carbon atoms but that this chain may be broken by such bivalent groups as —NH—, as in the laurylaminoethylene radical; or —CONH—, as in the lauroylaminohexamethylene radical; or —COO— as in the lauroyloxyethylene radical; or —O—, as in the dodecyloxyethylene radical; or —S—, as in the dodecylmercaptoethylene radical. The bivalent low-molecular bridging group which will be designated $R_3$ in the following, may be aliphatic, for example methylene; or aryl, for example phenylene; or aralkyl, for example phenylmethylene. These compounds can be represented by the general formula

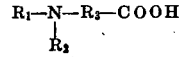

wherein $R_1$ represents an aliphatic group containing at least 6 carbon atoms which may be broken by a bivalent group selected from the class consisting of —NH—, —CONH—, —COO—, —O— and —S—; $R_2$ is a substituent selected from the class consisting of the same radicals as $R_1$ and H, and $R_3$ is a bivalent substituent selected from the class consisting of aliphatic, aryl and aralkyl radicals. In the compounds represented by the above general formula any of the specific $R_3$ groups mentioned previously may be combined with any of the specific $R_1$ groups listed when $R_2$ is hydrogen and, when $R_2$ represents one of the specific groups listed under the definition of $R_1$, this may be combined with the same or with a different R, substituent and with any one of the specific $R_3$ substituents listed.

I have found that optimum results are obtained in the case of surface active agents falling within the above formula wherein $R_2$ represents hydrogen and $R_1$ represents the group $R_4$—$(NH \cdot C_2H_4)_n$—, wherein $R_4$ is an aliphatic alkyl substituent group containing from 6 to 10 carbon atoms and $n$ is an integer from 1 to 3. The general formula of these compounds is

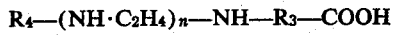

wherein $R_3$ is a bivalent substituent group selected from the class consisting of aliphatic, aryl and aralkyl radicals, $R_4$ is an alkyl group containing from 6 to 10 carbon atoms, and $n$ is an integer from 1 to 3. Equally good results are obtained in the case of compounds in which both $R_1$ and $R_2$ of the above general formula designate the groups $R_4$—NH—$C_2H_4$—, wherein $R_4$ is a group defined as above. The general formula of these compounds would be:

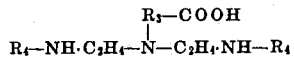

When mixtures of the last two types of surface active agents are employed a more-than-additive effect appears to be produced since the total quantity required is less than that of either type employed alone. These mixtures therefore represent my preferred embodiment.

Among the specific compounds which have proved effective in my process there may be mentioned octyl glycine, dodecyl aminobenzoic acid, octylamino salicylic acid, N,N'-di-octyl ethylene diaminoacetic acid, decylamino propionic acid, octylamino phenylacetic acid, decyl hydroxy ethyl glycine, dioctyl glycine, dodecyl amino ethylglycine, lauryl amino ethylamino propionic acid, palmitic acid ester of hydroxy ethylamino ethylglycine, dodecylmercapto ethylglycine, octyl-di(aminoethyl)aminoethylsalicylic acid, decyl-tri(aminoethyl) glycine, di(octylaminoethyl) glycine, N-methyloleoylglycine and N-methylstearoylglycine.

All of these compounds are effective within the concentration range of from 0.01 to 1 g. per liter or from 0.001 to 0.1 per cent of the water to be frozen. The compounds defined as above are all sufficiently soluble in water to produce effective concentrations within the concentration range indicated. But in order to increase their solubility they may be used in the form of their acid salts with any organic or inorganic acid. The acids react with the basic nitrogen atom. The sodium salts are likewise effective.

As indicated previously the particular class of surface active agents defined as above do not cause frothing in the concentrations specified. They have an excellent bactericidal effect especially when the ice is melted; furthermore they are unobjectionable in physiological and pharmacological respects so that they cannot be harmful to health.

When any of these compounds are used in the manufacture of clear bactericidal ice the freezing procedure may be conducted in conventional manner. It is merely necessary to add the surface active agent before the water is frozen. It can be added substantially at the point when freezing commences since the air blown through the water causes rapid dissolution and mixing. They can be added in powdered form if desired but it is usually more convenient to dissolve them first in a small quantity of water and then to add the calculated quantity of the solution to the water to be frozen.

My invention can be described in greater detail by reference to the following specific examples which represent practical operating embodiments of my process.

Example 1

In this example 0.08 g. of octyldi(aminoethyl) glycine and 0.02 g. of di(octylaminoethyl) glycine are dissolved in 1 liter of water. The latter is then frozen in the usual manner while air is blown through. No frothing occurs and a clear ice results. This ice is ideal for preserving in fresh condition the catches on fishing vessels and its use results in a reduction of the usual odors accompanying such ships.

Example 2

In this example 0.05 g. of dodecyl-di(aminoethyl)aminoethyl salicylic acid and 0.05 g. of di(decylhydroxyethylaminoethyl) glycine are dissolved in 1 liter of water before freezing. Again no froth is formed and an excellent bactericidal ice is produced.

Example 3

In this example 0.1 g. of cetyltriethylenetetraaminobenzoic acid is dissolved in 1 liter of water just before freezing, in the production of clear ice. No froth is produced during freezing and an excellent clear ice is obtained. This ice has about the minimum bactericidal properties which are required in an ice of this character.

Example 4

In this example 0.2 g. of octyl glycine is dissolved in 1 liter of water before the freezing step, in the manufacture of clear bactericidal ice. No froth is formed by the air passing through the freezing liquid. The resulting ice is found to be clear and to have a satisfactory bactericidal action.

Example 5

In this example 0.1 g. of the palmitic acid ester of hydroxyethylaminoethyl glycine is dissolved in 1 liter of water before the freezing step, in the manufacture of clear bactericidal ice. No froth is formed during freezing and the product obtained is found to be clear and to produce a satisfactory bactericidal effect.

Example 6

In this example 0.1 g. of dodecylmercapto ethylglycine is dissolved in 1 liter of water before the freezing step, in the manufacture of clear bactericidal ice. No froth is formed during freezing and the product is found to be clear with satisfactory bactericidal properties.

Example 7

In this example 0.15 g. of octyl-di(aminoethyl) aminoethylsalicylic acid is dissolved in 1 liter of water before the freezing step, in the manufacture of bactericidal ice. No froth is formed during freezing and the product is clear, having satisfactory bactericidal properties.

Example 8

0.05 g. of octyl-di(aminoethyl)aminoethylsalicylic acid and 0.05 g. of N,N'-dioctyl ethylenediaminoacetic acid are dissolved in 1 liter of water and the solution is then frozen while air is blowing through. The resulting clear ice has satisfactory bactericidal properties. No froth is produced during freezing.

Any of the other surface active agents defined as above can be substituted in the same proportions in the above specific examples with the production of satisfactory results.

While I have disclosed what I consider to be the best operating embodiments of my process it is evident, of course, that various modifications can be made in the specific procedures which have been described without departing from the purview of this invention. Thus the concentration of surface active agents can be varied to produce a higher or lower bactericidal effect in accordance with the particular use which is to be made of the clear ice. In industrial applications wherein the ice is to come into contact only with the containers in which food is placed, somewhat higher concentrations can be used. It is desirable to thoroughly clean and to sterilize the bins in which the ice and foodstuff is to be placed before making use of the clear ice of this invention. Tests will then show that the bins will remain substantially bacteria free as long as they are kept filled with my bactericidal ice. It might have been expected that the surface active agent would be in higher concentration on the outer surfaces of the ice particles as compared with the inside of the particles. But my tests show that my surface active agents are uniformly distributed throughout the ice particles. This is a particular advantage of the ice produced by the described process. Other modifications of my process which fall within the scope of the following claims will be immediately evident to those skilled in this art.

What I claim is:

1. In the manufacture of bactericidal clear ice suitable for use in the preservation of fish and other food items, the process which comprises dissolving in water which is to be frozen a mixture of two bactericidal agents, one having the general formula

and the other the general formula

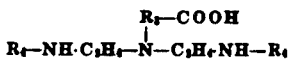

wherein $R_4$ is an alkyl group containing from 6 to 10 carbon atoms, $R_3$ is a bivalent substituent group selected from the class consisting of aliphatic, aryl and aralkyl radicals, and $n$ is an integer from 1 to 3, the total concentration of said bactericidal agents dissolved in the water being from about 0.001 to 0.1% by weight, then freezing the water while blowing air therethrough and recovering the resulting bactericidal clear ice.

2. In the manufacture of bactericidal clear ice suitable for use in the preservation of fish and other foodstuffs, the process which comprises dissolving in water which is to be frozen a mixture of about 0.08 g. per liter of octyl di(aminoethyl) glycine and about 0.02 g. per liter of di(octylaminoethyl) glycine, then freezing the water while blowing air therethrough, and recovering the resulting bactericidal clear ice.

3. In the manufacture of bactericidal clear ice suitable for use in the preservation of fish and other foodstuffs, the process which comprises dissolving in water which is to be frozen a mixture of about 0.05 g. per liter of dodecyl-di(amnoethyl)aminomethylsalicylic acid and 0.05 g. per liter of di(decylhydroxyethylaminoethyl) glycine, then freezing the water while blowing air therethrough, and recovering the resulting bactericidal clear ice.

References Cited in the file of this patent

UNITED STATES PATENTS

| | | |
|---|---|---|
| 2,164,781 | Platz et al. | July 4, 1939 |
| 2,356,587 | Hentrich et al. | Aug. 22, 1944 |
| 2,398,781 | Frandsen | Apr. 23, 1946 |
| 2,468,012 | Isbell | Apr. 19, 1949 |
| 2,521,358 | Galvin | Sept. 5, 1950 |
| 2,669,520 | Fellers | Feb. 16, 1954 |

FOREIGN PATENTS

| | | |
|---|---|---|
| 71,045 | Netherlands | Sept. 16, 1952 |